US008422796B2

United States Patent
Kitai

(10) Patent No.: US 8,422,796 B2
(45) Date of Patent: Apr. 16, 2013

(54) IMAGE PROCESSING DEVICE

(75) Inventor: Tsubasa Kitai, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 436 days.

(21) Appl. No.: 12/610,634

(22) Filed: Nov. 2, 2009

(65) Prior Publication Data

US 2010/0329577 A1  Dec. 30, 2010

(30) Foreign Application Priority Data

Jun. 24, 2009  (JP) ................................. 2009-150139

(51) Int. Cl.
G06F 17/00 (2006.01)
G06F 3/048 (2006.01)
G06K 9/00 (2006.01)
G06K 9/34 (2006.01)

(52) U.S. Cl.
USPC ........... 382/224; 382/176; 715/209; 715/243; 715/838

(58) Field of Classification Search ........................ None
See application file for complete search history.

(56) References Cited

U.S. PATENT DOCUMENTS

| 5,765,176 A * | 6/1998 | Bloomberg ................... 715/209 |
| 6,442,555 B1 * | 8/2002 | Shmueli et al. ....................... 1/1 |
| 2001/0014184 A1 * | 8/2001 | Bubie et al. ................... 382/293 |
| 2008/0008391 A1 * | 1/2008 | Geva et al. ..................... 382/224 |
| 2008/0028292 A1 * | 1/2008 | Graham et al. ............... 715/230 |
| 2009/0119574 A1 * | 5/2009 | Gitlin et al. ................... 715/209 |
| 2009/0153496 A1 * | 6/2009 | Kurihara et al. .............. 345/173 |
| 2009/0199131 A1 * | 8/2009 | Kagan ........................... 715/810 |

FOREIGN PATENT DOCUMENTS

| JP | 2002-278994 A | 9/2002 |
| JP | 2004-194146 A | 7/2004 |
| JP | 2007-148505 A | 6/2007 |
| JP | 2007-259060 A | 10/2007 |

\* cited by examiner

Primary Examiner — Andrew W Johns
Assistant Examiner — David F Dunphy
(74) Attorney, Agent, or Firm — Sughrue Mion, PLLC

(57) ABSTRACT

Eliminating the need for a user to provide settings of a thumbnail image every time a document is scanned by detecting a format of a document by analyzing fields of the document, determining which of the fields are to be included in a thumbnail image of the document and positions of the fields to be included in the thumbnail image based on the format, and generating the thumbnail image accordingly.

11 Claims, 17 Drawing Sheets

FIG.6

SELECT TARGET AREA FOR CREATION OF THUMBNAILS

DISPLAY OF FORM IMAGE  (SCALE-UP) B1  (SCALE-DOWN) B2

MODE OF TARGET AREA SPECIFICATION  (CELL-BASIS SPECIFICATION) B7  (FREE SPECIFICATION) B8

| AREA NAME | SIZE |
| --- | --- |

(OK) B5    (CANCEL) B6 xxx APPLICATION FORM

EMPLOYEE NUMBER:
NAME:
SECTION/DEPARTMENT:
REASON OF APPLICATION:

APPLICANT'S SEAL:   SUPERVISOR'S SEAL:

DETERMINE LAYOUT OF THUMBNAILS xxx APPLICATION FORM
- EMPLOYEE NUMBER: AREA 1
- NAME: AREA 2
- SECTION/DEPARTMENT:
- REASON OF APPLICATION:

APPLICANT'S SEAL: | SUPERVISOR'S SEAL: AREA 3

MODE OF THUMBNAIL SIZE — FIXED / (AUTOMATIC)
MODE OF THUMBNAIL SIZE — 50 × 50 mm
MODE OF THUMBNAIL SIZE — USER SPECIFICATION / (AUTOMATIC)

THUMBNAIL TARGET AREA — Rt

| AREA NAME | SIZE |
|---|---|
| AREA 2 | 7.6 × 0.8cm | DETAILS |
| AREA 3 | 2.0 × 2.0cm | DETAILS |

LAYOUT 1 ☆ | LAYOUT 2 | ✛ ADDITION OF LAYOUT — RL

AREA 1
AREA 2
AREA 3

B14 REPRESENTATIVE LAYOUT

B5 — OK    B6 — CANCEL

IMAGE PROCESSING DEVICE

CROSS-REFERENCE TO RELATED APPLICATIONS

This application is based on and claims priority under 35 USC 119 from Japanese Patent Application No. 2009-150139 filed Jun. 24, 2009.

BACKGROUND

1. Technical Field

The present invention relates to an image processing device.

2. Related Art

For a user to view an image group, there is a technology of allowing the user to appropriately acquire any information from scaled-down images (hereinafter, referred to as thumbnail images) needed for identification of the images.

SUMMARY

According to an aspect of the invention, there is provided an image processing device, including: a format information storage unit for storing format information about a format of a document varying in type; an extraction-portion determination information storage unit for storing, on a basis of the format, extraction-portion determination information for use to determine which of a plurality of configuration portions is extracted from the document; a placement information acquisition unit for acquiring placement information about to where the configuration portion extracted from the document is placed; an image data acquisition unit for acquiring image data of the document; a format determination unit for acquiring format information about a format of the document of the image data through an analysis of the image data acquired by the image data acquisition unit, and determining the format of the document through a comparison with the format information stored in the format information storage unit; an extraction unit for reading, from the extraction-portion determination information storage unit, the extraction-portion determination information corresponding to the format determined by the format determination unit, and extracting the configuration portion determined by the extraction-portion determination information from the image data; an alternative image generation unit for generating an alternative image derived by placing the configuration portion extracted by the extraction unit at the position found in the placement information acquired by the placement information acquisition unit; and a writing unit for writing the alternative image generated by the alternative image generation unit into a storage unit.

BRIEF DESCRIPTION OF THE DRAWINGS

Exemplary embodiments of the present invention will be described in detail based on the following figures, wherein:

FIG. 6 is a diagram showing an exemplary screen for selection of target area specification mode;

FIG. 11 is a diagram showing an exemplary layout screen for registration of a plurality of layouts;

DETAILED DESCRIPTION

1. Definition

Figure 1:
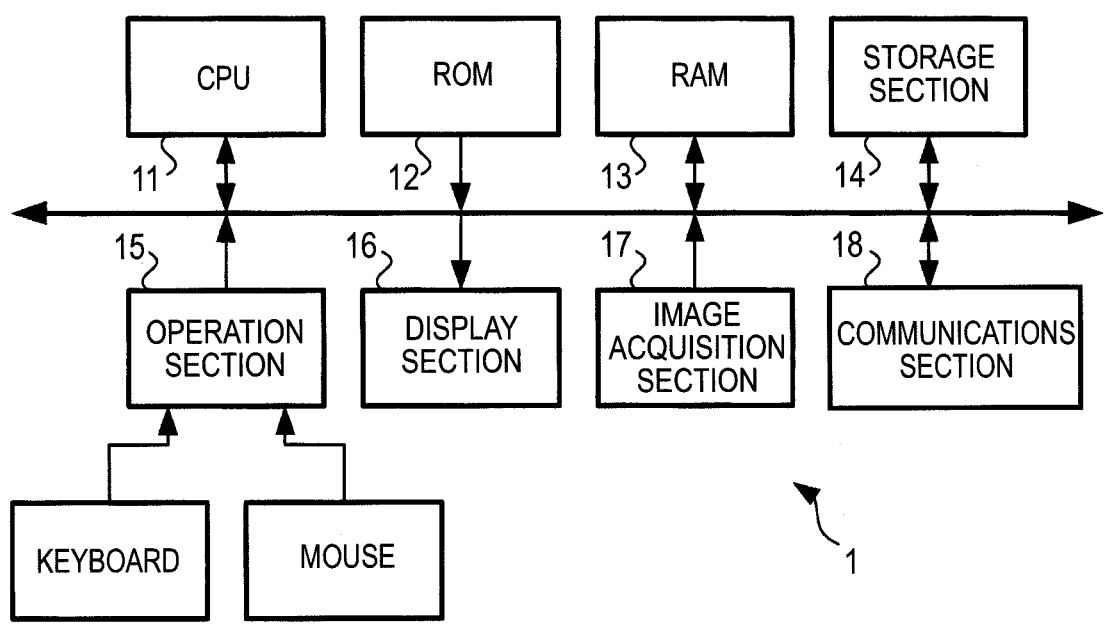
FIG. 1 is a block diagram showing the configuration of an image processing device in its entirety.

Described below are definitions of terms.

The term of "alternative image" means an image smaller in size than an original image, and an image for an alternative use of the original image. Hereinafter, such an alternative image is also referred to as thumbnail.

The term of "format" means a predetermined document configuration, and indicates the position of a field ruled or boxed on the document, for example. Any model pattern provided for reading of the configuration of any document in such a format is referred to as "form". The term of "field" means an area for writing of characters using a writing implement such as a pen, and a boxed field is called "cell".

The term of "thumbnail target area" means any configuration portion of a document extracted from a plurality of those configuring the document. The configuration areas are combined together or placed as appropriate so that a thumbnail is created.

The term of "layout" means, in a thumbnail, placement information about the position to where a thumbnail target area is laid out, and information about a scaling-down factor for an image of each of the thumbnail target areas.

The term of "format information about a form" means data about the position of ruled lines or others in the entire image of a form, and also information about the format of a document. Assuming that the x axis is the main scanning direction and the y axis is the sub scanning direction for scanning of the form image using a scanner or others, the position on the form image is represented by two numerical data values of (x, y) with a reference point at the first-scanned position, for example. A line is represented by two points, and a rectangle is represented by four points. Such a line and a rectangle are respectively provided with an additional numerical data value representing the line thickness, whereby the line and the rectangle are respectively ruled and boxed. The format information about the form is configured by such numerical data values. Note here that the reference point is not necessarily at the first-scanned position, i.e., not necessarily be a point at the far end in the form image, and may be a point where a ruled line or others are scanned first.

The term of "difference between two format information" means the sum of difference between two numerical data values each configuring the format information. More specifically, based on the relative positioning of points in each of the format information, the points in one of the format information are correlated with those in the remaining format information, and a difference between the numerical data values of any two correlated values is summed up. The numerical data values are those of x and y coordinates. Accordingly, even if a document filled in in accordance with a specific form is scaled up or down with respect to the form being a reference, as long as the value of the scale-up or -down factor falls within a specific threshold range, the document can be defined by form through a comparison of a difference between the format information with a predetermined threshold value. The format information here is the one about the document, and the one about the reference form. By the document defined by form as such, fields formed by ruled lines or others are also defined on the document.

The term of "pointer of a mouse" means an image moving on the screen in response to the movement of a mouse to indicate where on the screen is pointed.

The term of "mouse click" means to depress a mouse button, and then release the button. With this operation, an icon or others displayed beneath the pointer when the mouse button is depressed is selected.

The term of "mouse drag and drop" means an operation of moving the mouse while the button is being depressed, and then the button is released after the completion of the movement. With this operation, an icon or others displayed beneath the pointer when the button is depressed is correlated with the position of the pointer when the button is released.

2. Configuration

Figure 2:
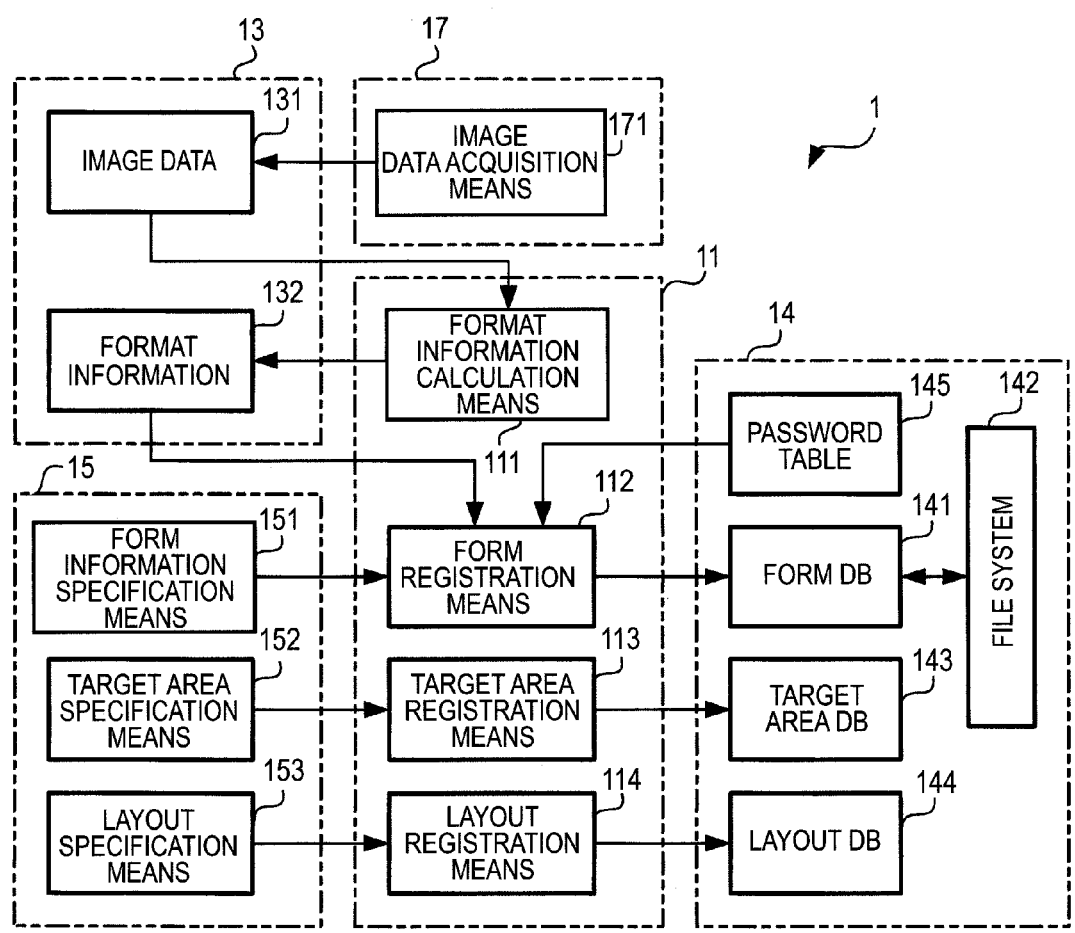
FIG. 2 is a block diagram showing the functional configuration of the image processing device related to form registration.

In the below, described is the configuration of an image processing device 1 in an exemplary embodiment of the invention.
2-1. Entire Configuration FIG. 1 is a block diagram showing the configuration of the image processing device 1 in its entirety. A CPU (Central Processing Unit) 11 is in charge of controlling components in the image processing device 1 by reading and running a boot loader stored in a ROM (Read-Only Memory) 12 or a computer program stored in a storage section 14. The ROM 12 is a nonvolatile storage device configured by a semiconductor element, for example, and is provided specifically for reading. The boot loader stored in such a ROM 12 is used for loading a basic OS (Operating System) stored in the storage section 14 into a RAM (Random Access Memory) 13. The ROM 12 stores therein also a BIOS (Basic Input/Output System), and others. The RAM 13 is used as a work area for program run by the CPU 11. The storage section 14 is a large-capacity nonvolatile storage device such as hard disk drive and an EEPROM (Electrically Erasable Programmable Read Only Memory), and serves to store programs to be read into the CPU 11. An operation section 15 is provided with a mouse and a keyboard for input of various types of commands. The operation section 15 accepts a user operation, and provides the CPU 11 with a signal corresponding to the operation details. A display section 16 includes a liquid crystal display screen, for example, and displays images thereon in response to any command coming from the CPU 11. An image acquisition section 17 is a unit serving to acquire image data representing a document, e.g., scanner that optically reads an image on a paper sheet, and generates image data of the image. A communications section 18 serves to exchange data with any external devices, and is exemplified by various types of modems, wireless communications circuits, serial interfaces, and wireless interfaces.
2-2. Functional Configuration
2-2-1. Functional Configuration Related to Form Registration FIG. 2 is a block diagram showing the functional configuration related to form registration in the image processing device 1. The image acquisition section 17 functions as an image data acquisition unit 171, which acquires, from a paper sheet or others written with a document, image data representing the document. The resulting image data acquired by the image data acquisition unit 171, i.e., image data 131, is stored in the RAM 13. The CPU 11 functions as a format information calculation unit 111, which reads the image data 131 from the RAM 13 for analysis, and calculates information about ruled lines and box lines in the image data 131, i.e., the position, length, thickness, and others of the lines. The result of calculation as such is format information 132. The format information 132 being the calculation result by the format information calculation unit 111 is stored in the RAM 13. The operation section 15 functions as a form information specification unit 151 that accepts a user operation, and acquires information about a form. Herein, the expression of "information about a form" includes form identification information, "destination" identification information, user identification information, and a password. The form identification information is for identifying the form such as form name, and the destination identification information is for specifying the location in the storage section 14 for storage of format information about the form. The user identification information is for identifying who is the user of the image processing device 1 that operates to store such form identification information and destination identification information in the storage section 14. The password is for determining whether or not the user indicated by the user identification information is correctly the authorized user.

The storage section 14 stores therein a password table 145 in which the user identification information about an authorized user is stored with a correlation with his or her password. The CPU 11 functions as a form registration unit 112 that registers the image data 131 acquired by the image data acquisition unit 171 as a form. This form registration unit 112 is provided with information about a form from the form information specification unit 151, and then refers to the password table 145 stored in the storage section 14 to determine whether or not the user indicated by the user identification information found in the provided information is authorized or not. When determining that the user is authorized, the form a registration unit 112 accordingly registers the form. To be specific, the form registration unit 112 accordingly establishes a correlation between the form identification information and the destination identification information before storage of those into a form database (the database is simply referred to as "DB" in the drawing) 141 in the storage section 14. The form registration unit 112 also stores the format information 132 about the form into a file system 142 of the storage section 14, i.e., into a file therein indicated by the destination identification information. That is, the storage section 14 including the form database 141 functions as a format information storage unit that stores format information about the formats of various types of documents.

A target area database 143 in the storage section 14 stores therein information about configuration portions extracted from a document, i.e., extraction-portion determination information, on a form basis. The extraction-portion determination information is the one used to define a thumbnail target area in the document by position, size, and others. That is, the storage section 14 including such a target area database 143 functions as an extraction-portion determination information storage unit, which stores, on a format basis, the extraction-portion determination information for determining which configuration portion is to be extracted from others configuring the document. The operation section 15 functions as a target area specification unit 152 for specifying the extraction-portion determination information used to define a thumbnail target area on a form basis in response to a user operation. The CPU 11 functions as a target area registration unit 113, which is provided with the extraction-portion determination information about the thumbnail target area from the target area specification unit 152, and stores the provided information into the target area database 143 with a correlation with the identification information about the corresponding form.

The layout database 144 in the storage section 14 serves to make a registration with a one-to-one relationship between a layout and a form. The operation section 15 functions as a layout specification unit 153 that specifies, in response to a user operation, a layout for a thumbnail target area registered in the target area database 143. That is, the layout specification unit 153 is an example of a placement information specification unit that specifies placement information in response to a user operation. The placement information is about the position to where the thumbnail target area determined by the extraction-portion determination information is laid out. The CPU 11 then functions as a layout registration unit 114, which is provided with the layout from the layout specification unit 153, and stores the layout into the layout database 144 with a correlation with the identification information about the form thereof.

2-2-2. Functional Configuration Related to Writing of Thumbnails

Figure 3:
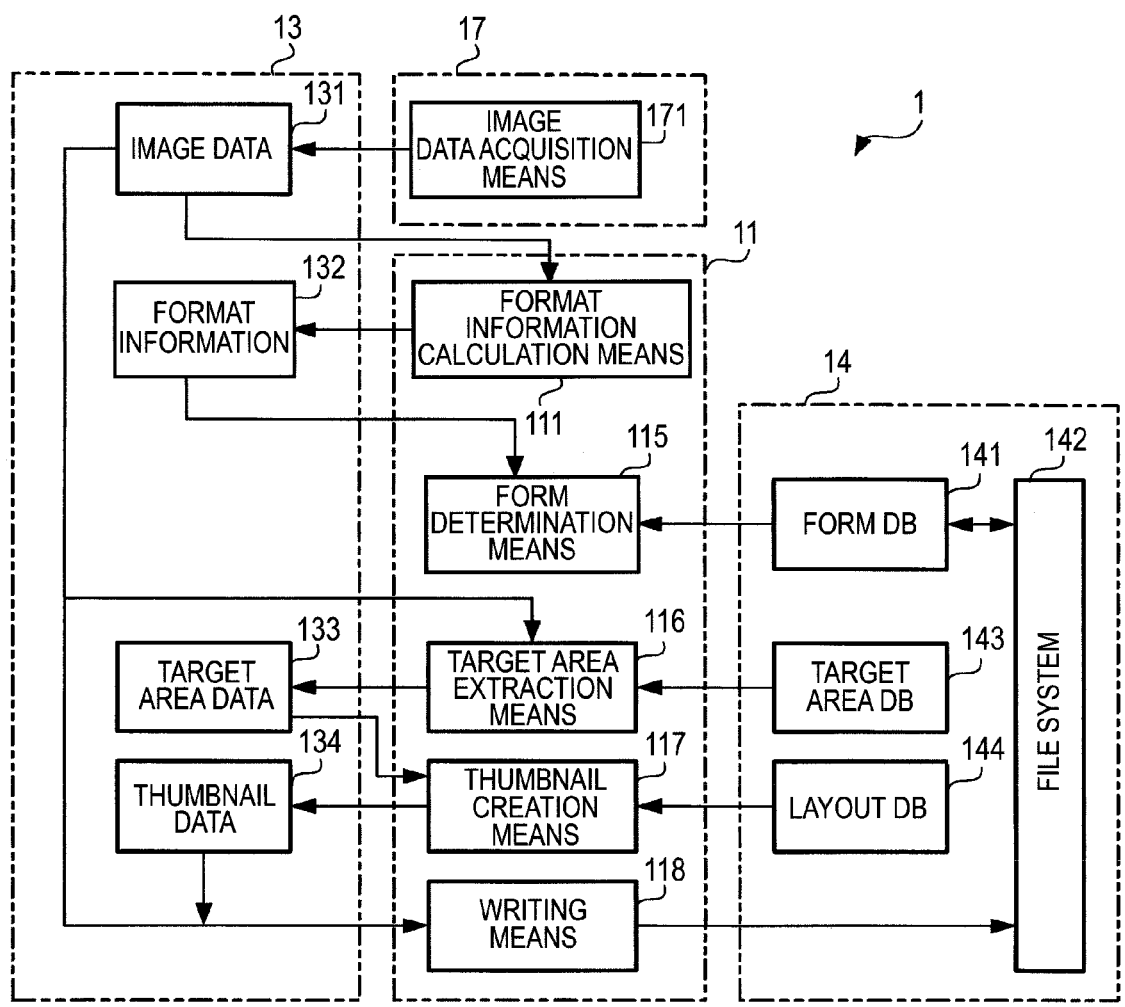
FIG. 3 is a block diagram showing the functional configuration related to writing of thumbnails.

FIG. 3 is a block diagram showing the functional configuration related to writing of thumbnails in the image processing device 1. The following functional configuration, i.e., the image data acquisition unit 171, the image data 131, the format information 132, and the format information calculation unit 111, is already described above, and thus is not described again. The databases in the storage section 14, i.e., the form database 141, the target area database 143, the layout database 144, are also described above, and thus are not described again.

The format information calculation unit 111 analyzes the image data 131 acquired by the image data acquisition unit 171, thereby calculating the format information 132 about the format of the document of the image data 131. The resulting format information 132 is stored in the RAM 13. The CPU 11 refers to the format information stored in the file system 142 via the form database 141 to find any format information showing a coincidence with the format information 132 stored in the RAM 13, thereby functioning as a form determination unit 115 for determining the form corresponding to the image data 131. That is, the format information calculation unit 111 and the form a determination unit 115 are each an example of a format determination unit for acquiring the format information about the format of the document of the image data through an analysis of the image data acquired by the image data acquisition unit, and determining the format of the document through a comparison with the format information stored in the format information storage unit.

Herein, the term of "coincidence between two format information" means that a difference therebetween falls within a predetermined threshold range. The CPU 11 also functions as a target area extraction unit 116 that reads the information about the thumbnail target area from the target area database 143, and extracts the target area data 133 of the image of the thumbnail target area from the image data 131 for storage into the RAM 13. The information about the thumbnail target area is about the position and size thereof stored with a correlation with the identification information about the form determined by the form determination unit 115. That is, the target area extraction unit 116 is an example of an extraction unit for reading the extraction-portion determination information corresponding to the format determined by the format determination unit, and extracting the thumbnail target area determined by the extraction-portion determination information from the image data 131. The CPU 11 then reads any of the layouts corresponding to the form from the layout database 144. That is, the CPU 11 functions as a placement information acquisition unit that acquires the placement information about to where the thumbnail target area extracted from the document is laid out. The CPU 11 then functions as a thumbnail creation unit 117 (alternative image generation unit) that generates thumbnail data 134 representing a thumbnail being an image disposed at the position indicated by the acquired layout, and stores the resulting thumbnail data into the RAM 13.

The CPU 11 also functions as a writing unit 118 that additionally provides the thumbnail data 134 stored by the thumbnail creation unit 117 into the RAM 13 to the image data 131 being the basis thereof, and then writes the addition result into the file system 142. Herein, if the image data is stored in an image format conforming to the standards such as EXIF (Exchangeable Image File Format) including JPEG (Joint Photographic Experts Group) and TIFF (Tagged Image File Format), the image data can include thumbnails. Accordingly, using such characteristics of the image format, the writing unit 118 performs data writing into the file system 142, i.e., writes the data including the thumbnail data 134 in the image data 131.

3. Operation

Described next is the operation of the image processing device 1.

3-1. Operation of Form Registration

Figure 4:
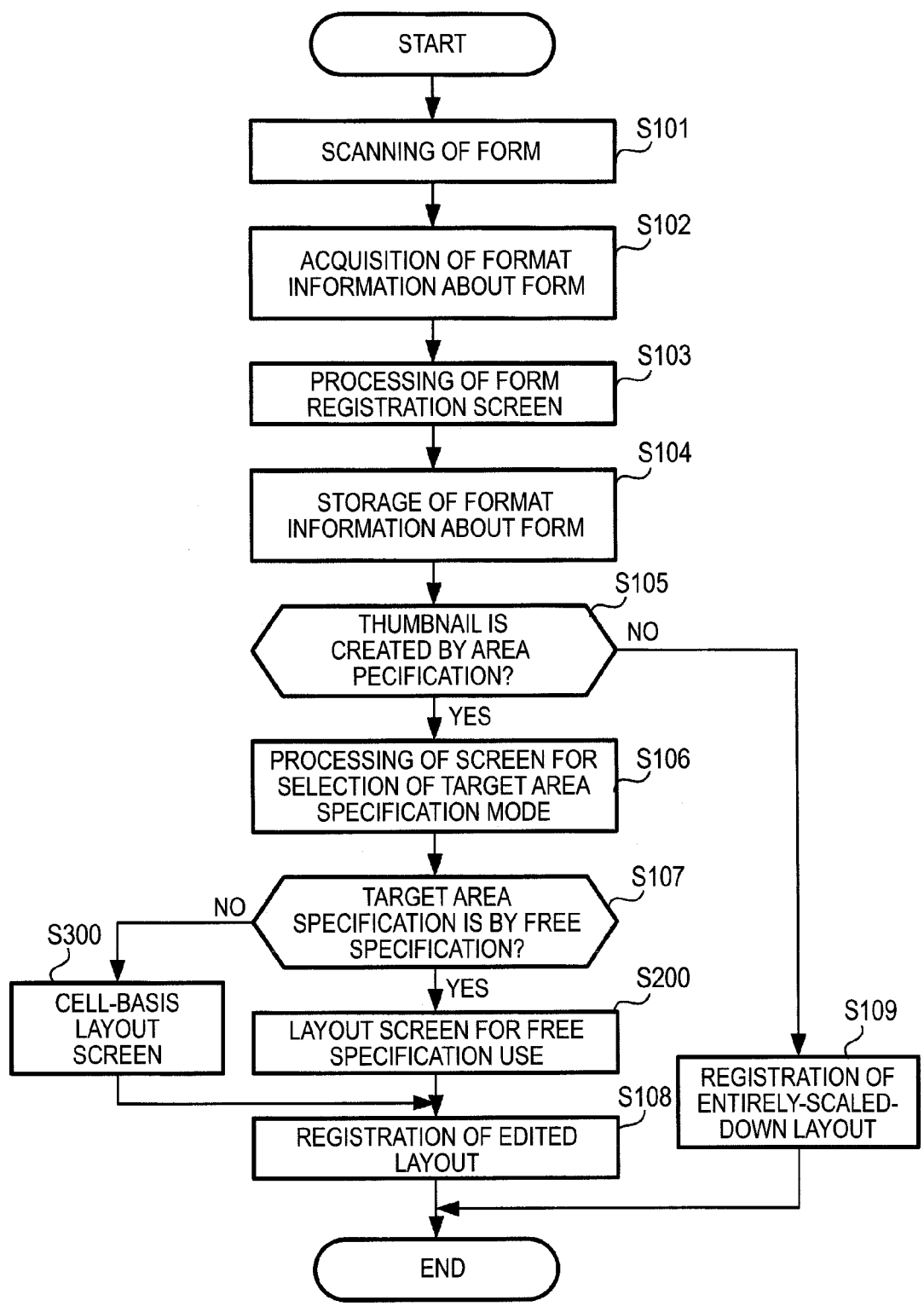
FIG. 4 is a flow diagram of the operation of form registration.

FIG. 4 is a flow diagram of the operation of form registration in the image processing device 1. First of all, a user places a form as a document of target registration on a platen glass (not shown) in the image acquisition section 17, and then issues a command for registration of the form by operating the operation section 15. In response thereto, the image acquisition section 17 being the image data acquisition unit 171 scans the form under the control of the CPU 11, and then forwards the image data 131 corresponding to the scanning details to the CPU 11 (step S101). The CPU 11 then stores the provided image data 131 into the RAM 13, and then functions as the format information calculation unit 111, i.e., calculates the format information 132 from the image data 131 for storage into the RAM 13 (step S102). To be more specific, the format information calculation unit 111 executes a labeling process to the image data 131, and extracts lines and rectangles from the image data 131. The format information calculation unit 111 then converts information about the lines and rectangles into numerical values so that the format information 132 is generated. The information about the lines and rectangles includes end points of the lines, vertex portions of the rectangles, and the thickness thereof, for example. Thereafter, the CPU 11 makes the display section 16 display thereon a screen for form registration to urge the user to input information about the form completed with scanning. The CPU 11 then executes a process to such a form registration screen (step S103).

Figure 5:
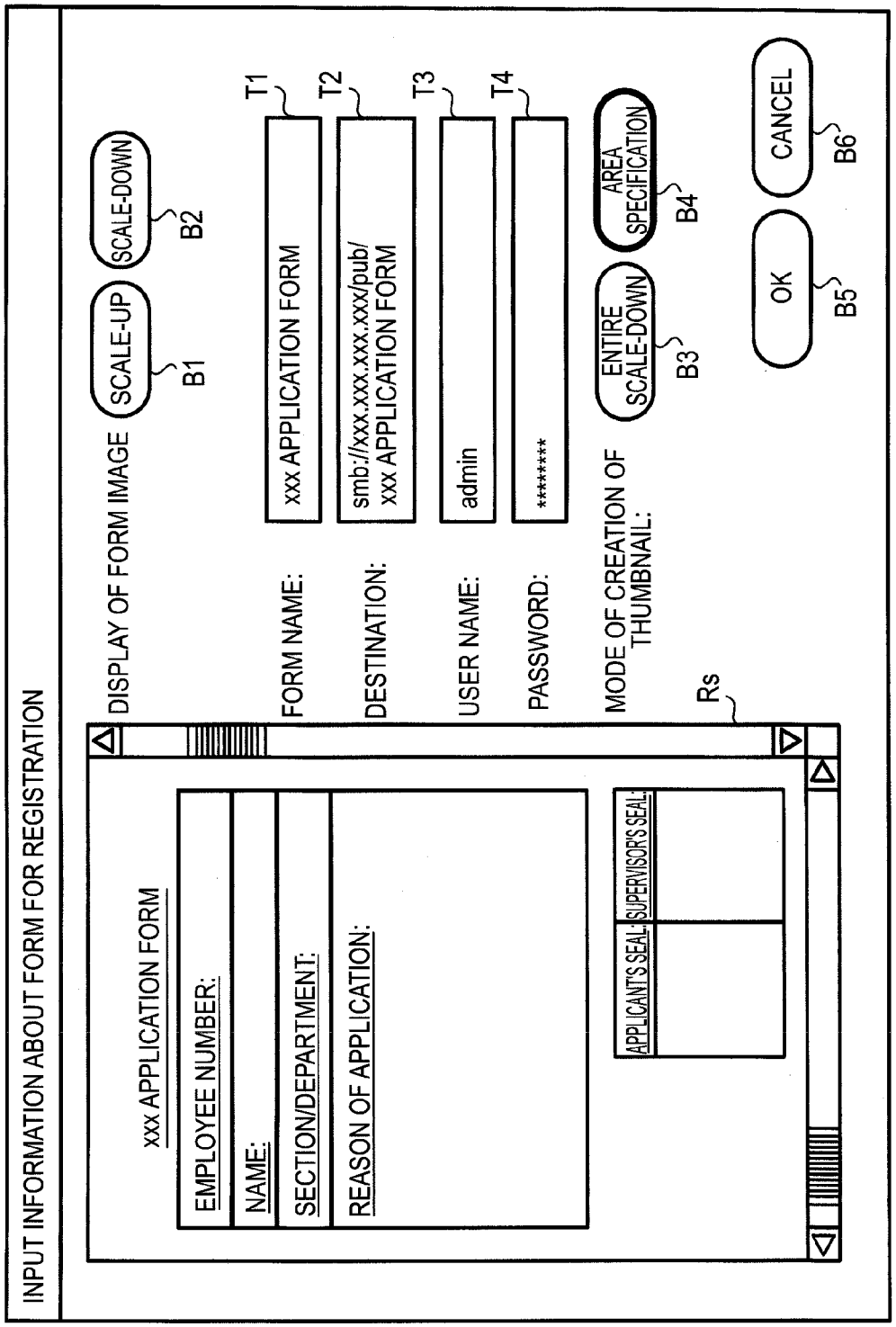
FIG. 5 is a diagram showing an exemplary screen for form registration.

FIG. 5 is a diagram showing an exemplary form registration screen. As shown in FIG. 5, the upper portion of the form registration screen displays a character string of "Input Information about Form for Registration". The lower left portion of the screen is provided with a preview area Rs for display of an image of the form completed with scanning (hereinafter, referred to as form image). When the form image cannot be displayed in its entirety, this preview area Rs is provided with a scroll bar for moving the display portion in the both vertical and horizontal directions. On the right side of the preview area Rs, buttons B1 and B2 are provided for scaling up and down the form image for display. The user moves the pointer of the mouse of the operation section 15 to inside of the button B1, and then makes a mouse click, whereby the form image is scaled up in the preview area Rs and then is displayed. When the user makes a mouse click after moving the pointer of the mouse to inside of the button B2, the form image is scaled down, and then is displayed.

Beneath the buttons B1 and B2, provided are text boxes T1, T2, T3, and T4. The text box T1 is for accepting an input of a form name, and the text box T2 is for accepting an input of destination for storing the calculated format information 132 into the file system 142 of the storage section 14. The text box T3 is for accepting an input of a user name, and the text box T4 is for accepting an input of the user's password. When the user inputs a character string to each of these text boxes T1, T2, T3, and T4 using the keyboard of the operation section 15, the character strings input as such are stored in the RAM 13 as the form name, the destination, the user name, and the password, respectively.

Beneath these text boxes, provided are buttons B3 and B4. The button B3 is used to change the mode for creation of thumbnails to "entire scale-down", and the button B4 is used to change the mode to "area specification". With a mouse click after the pointer is moved to either the button B3 or B4, the selected button is framed by a thick line. FIG. 5 shows an exemplary screen when the user makes a mouse click after moving the pointer to the button B4. As a result of such a mouse click, the mode of the framed button is stored in the RAM 13 as the mode for creation of thumbnails.

The lower right portion of the screen includes an OK button B5, and a cancel button B6. With the OK button B5, every input made on the form registration screen is permitted, and is rejected with the cancel button B6. With a mouse click after the pointer is moved to the OK button B5, the information stored in the RAM 13, i.e., the form name, the destination, the user name, the password, and the mode for creation of thumbnails, is used in the process in the next step S104. On the other hand, with a mouse click after the pointer is moved to the cancel button B6, the CPU 11 terminates the process, and the procedure returns to step S101.

After the completion of various types of settings on the form registration screen, when a mouse click is made on the OK button B5, the CPU 11 verifies a combination of the user name and the password stored in the RAM 13 against the details of the password table 145 provided in advance in the storage section 14. In this manner, the CPU 11 determines whether or not the user who made the input is authorized. When determining that the user is authorized by such verification, the CPU 11 stores the format information 132 about the form calculated in step S102 to the destination found as above in the file system 142. Such a storage is made with a correlation with the form name stored in the RAM 13 (step S104). Herein, when such an input results in some kind of error, the CPU 11 controls the display section 16 to display a screen for notifying the user of the error, thereby urging the user to make an input again.

The CPU 11 then determines whether or not the mode for creation of thumbnails stored in the RAM 13 is "area specification" (step S105). When determining that the mode for creation of thumbnails is not "area specification" (step S105: NO), the CPU 11 stores that the mode for creation of thumbnails with the form is "entire scale-down" into the layout database 144 of the storage section 14 (step S109), and this is the end of the process. On the other hand, when determining that the mode for creation of thumbnails is "area specification" (step S105: YES), the CPU 11 controls the display section 16 to display a screen for selection of target area specification mode for use to select which mode to specify a thumbnail target area, and then executes a process to the screen for selection of target area specification mode (step S106).

FIG. 6 is a diagram showing an exemplary screen for selection of target area specification mode. As shown in FIG. 6, the right portion of the screen displays buttons B7 and B8. The button B7 is used to select "cell-basis specification" as the mode of target area specification, and the button B8 is used to select "free specification" thereas. Similarly to the mode for creation of thumbnails described above, the clicked button is framed by a thick line. With a mouse click on the button B7, the mode of "cell-basis specification" is selected as the mode of target area specification, and then is stored in the RAM 13. With a mouse click on the button B8, the mode of "free specification" is selected as the mode of target area specification, and then is stored in the RAM 13. Thereafter, with a mouse click on the button B5, the procedure goes to step S107.

In step S107, the CPU 11 determines whether or not the mode of target area specification stored in the RAM 13 is "free specification" (step S107). When determining that the mode of target area specification is "free specification" (step S107: YES), the CPU 11 displays a layout screen on the display section 16 for free specification use (step S200), and when determining that the mode is not "free specification" (step S107: NO), the CPU 11 displays a layout screen on the display section 16 for cell-basis specification use (step S300). The CPU 11 then executes a process to suit the selected mode. Thereafter, the CPU 11 stores, into the layout database 144, the layouts being the edition results on the respective layout screens with a correlation with the form, thereby registering the layouts (step S108).

Figure 7:
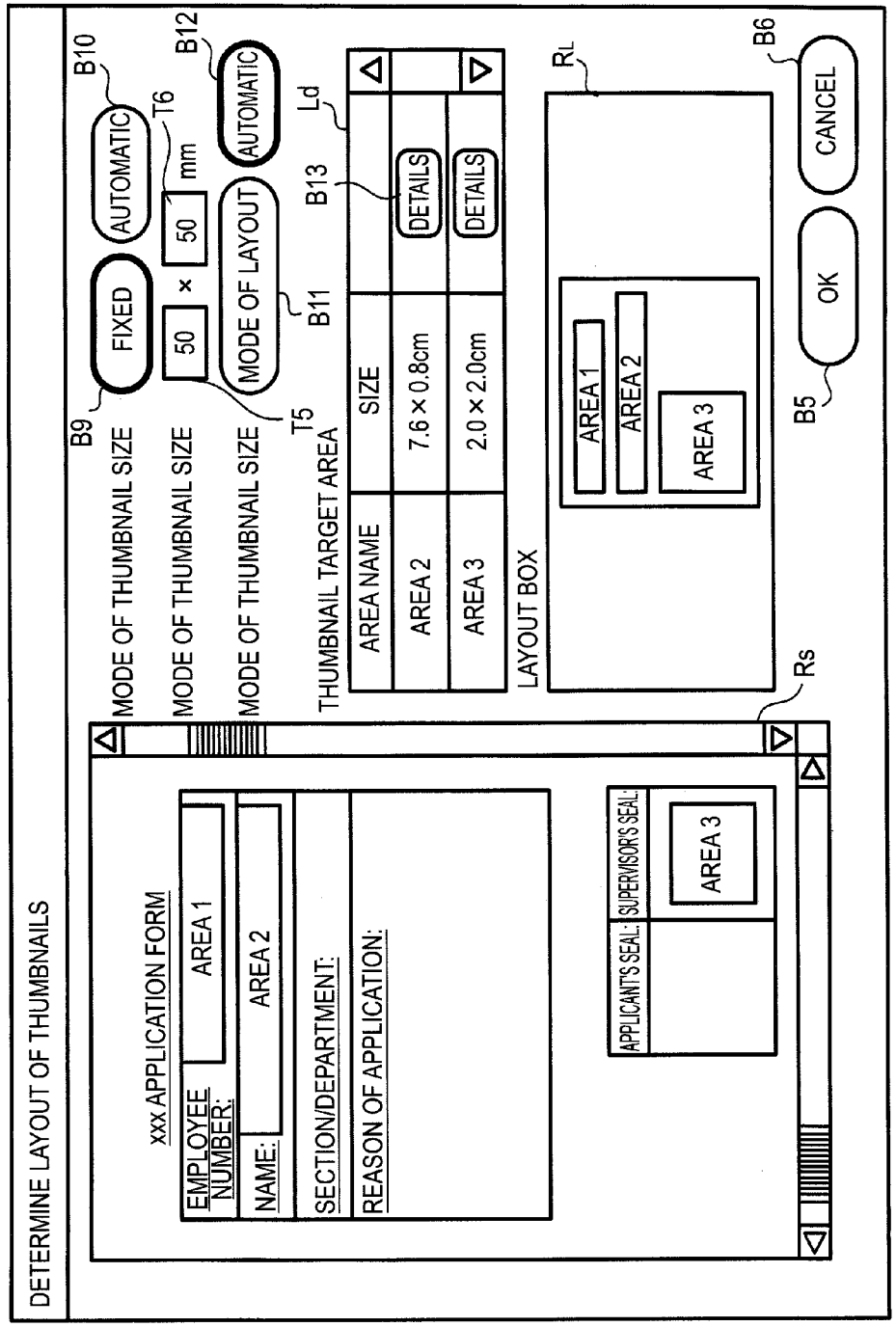
FIG. 7 is a diagram showing an exemplary layout screen for free specification use.

FIG. 7 is a diagram showing an exemplary layout screen for free specification use. As shown in FIG. 7, the left portion of the layout screen for free specification use displays a preview area Rs. When a user moves the pointer to inside of the preview area Rs, and then by mouse drag-and-drop, the CPU 11 acquires a rectangle defined by coordinates of pixels specified by the pointer, for example. The rectangle defined as such is a thumbnail target area, and this is called "free specification". On the other hand, with "cell-basis specification", the CPU 11 acquires a cell specified in the form as a thumbnail target area. If this is the case, the user moves the pointer to any of the cells in the form in the preview area Rs, and then makes a mouse click to inside of the cell so that the CPU 11 acquires the cell as a thumbnail target area.

The upper right portion of the preview area Rs displays a plurality of buttons B9 to B12, and text boxes T5 and T6. The middle right portion of the layout screen displays a list Ld for a detailed setting use of the thumbnail target area. The lower right portion of the layout screen displays a layout box $R_L$ for layout use of the thumbnail target area.

The mode of thumbnail size is used for setting of the size of the thumbnails, and is varied in type, i.e., one is "fixed", and the other is "automatic". The buttons displayed on the upper right portion of the screen are those for selecting the mode of thumbnail size, i.e., the button B9 is for setting to "fixed", and the button B10 is for setting to "automatic". FIG. 7 shows an exemplary case where the button B9 is selected, and the mode of thumbnail size is set to "fixed". With the mode of thumbnail size set to "fixed" as such, the text boxes T5 and T6 displayed beneath these buttons B9 and B10 are both ready for input of numerical values, and the thumbnail size is set in accordance with the numerical values. In FIG. 7 example, because the text boxes T5 and T6 are both provided with a numerical value of "50", the thumbnail size is accordingly set to 50 mm both in the vertical direction and horizontal directions. As a result, the layout box $R_L$ on the lower right portion of the screen displays a thumbnail of a size of 50 mm in both the vertical and horizontal directions. On the other hand, when the mode of thumbnail size is set to "automatic", the thumbnail size is automatically set in accordance with the thumbnail size displayed in the layout box $R_L$.

The mode of layout is used to set the layout of a thumbnail, and is varied in type, i.e., one is "user specification", and the other is "automatic specification". For selecting such a mode of layout, used are buttons B11 and B12. The button B11 is for setting to "user specification", and the button B12 is for setting to "automatic specification". FIG. 7 example shows a case where the button B12 is selected, and the mode of layout is set to "automatic specification". When the mode of layout is set to "automatic specification" as such, a thumbnail target area in the layout box $R_L$ is automatically laid out in accordance with a predetermined algorithm. The predetermined algorithm can be varied in type, and with an exemplary algorithm, the CPU 11 lays out a thumbnail target area in the layout box $R_L$ in order of selection and according to a priority. The priority is defined by a scan line that goes from left to right of the layout box $R_L$, and when reaching the far right end thereof, moves down a line. As an alternative algorithm, any selected thumbnail target areas may be laid out to have the resulting thumbnail look as square as possible by combining those considering their sizes in both vertical and horizontal directions.

On the other hand, when the mode of layout is set to "user specification", a thumbnail target area is laid out in response to a layout edition operation by the user to the layout box $R_L$. With such a layout edition operation, specifically, a thumbnail target area selected by the user's depression of the mouse button is additionally provided to the layout box $R_L$ from the preview area Rs by mouse drag-and-drop, or such thumbnail target area is moved by mouse drag-and-drop in the layout box $R_L$.

Figure 8:
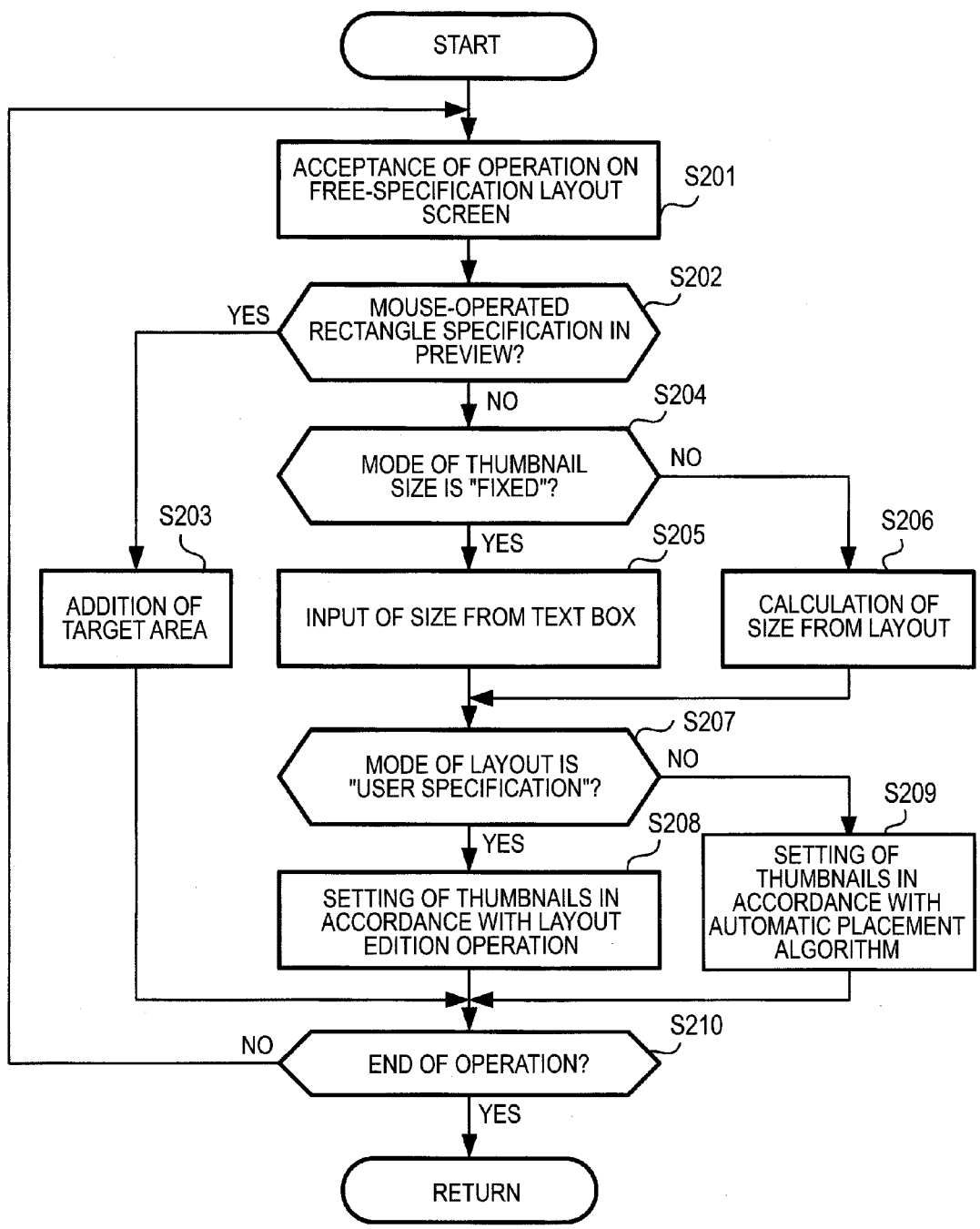
FIG. 8 is a flow diagram for illustrating the operation of a layout edition process.

FIG. 8 is a flow diagram for illustrating the operation of a layout edition process by the image processing device 1 with display of a layout screen for free specification use. As shown in FIG. 8, the CPU 11 accepts an operation of layout edition with display of a layout screen for free specification use (step S201). The CPU 11 then determines whether or not a rectangle specification is made by the mouse inside of the preview area Rs (step S202). Herein, the rectangle specification is made by the user with a mouse drag-and-drop operation in the state that the pointer is located in the preview area Rs, and two positions are specified in the preview area Rs. Herein, the two positions specified as such are either a combination of an upper left point and a lower right point of a rectangle, or a combination of an upper right point and a lower left point thereof.

When determining that the rectangle specification is made by the mouse inside of the preview area Rs (step S202: YES), the CPU 11 additionally provides the rectangular specified as such as a new thumbnail target area (step S203), and the procedure then goes to step S210. With such an addition of a new thumbnail target area, the detailed-setting list Ld is newly provided with a line corresponding to the new thumbnail target area. On the other hand, when determining that the rectangle specification is not made by the mouse inside of the preview area Rs (step S202: NO), the CPU 11 determines whether or not the mode of thumbnail size is set to "fixed" (step S204). When determining that the mode of thumbnail size is set to "fixed" (step S204: YES), the CPU 11 reads the numerical values input to the text boxes T5 and T6, and the thumbnail size is set to the size corresponding to the numerical values read as such (step S205). On the other hand, when determining that the mode of thumbnail size is not set to "fixed" (step S204: NO), the CPU 11 automatically sets the thumbnail size in accordance with the thumbnail size displayed in the layout box $R_L$ (step S206).

The CPU 11 then determines whether or not the mode of layout is set to "user specification" (step S207). When determining that the mode of layout is set to "user specification" (step S207: YES), the CPU 11 sets the thumbnail layout by laying out a thumbnail target area in response to a user's layout edition operation (step S208), and the procedure then goes to step S210. On the other hand, when determining that the mode of layout is not set to "user specification" (step S207: NO), the CPU 11 sets the thumbnail layout by automatically laying out a thumbnail target area in accordance with a predetermined algorithm (step S209), and the procedure then goes to step S210.

Then in step S210, the CPU 11 determines whether or not the operation is ended with a mouse click on the OK button B5. When the CPU 11 determines that the operation is not yet ended (step S210: NO), the procedure returns to step S201. On the other hand, when determining that the operation is ended (step S210: YES), the CPU 11 ends the layout edition process.

Figure 9:
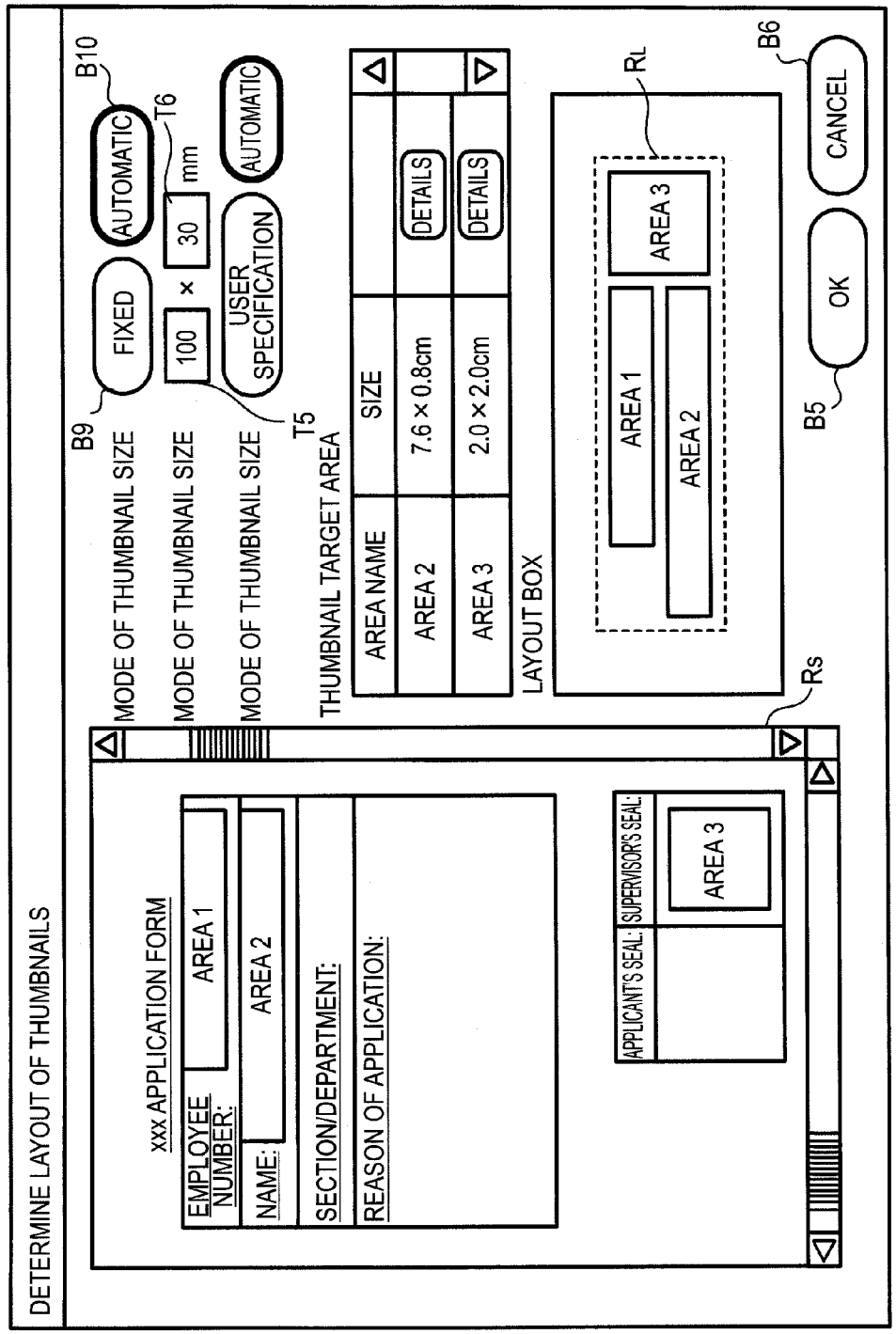
FIG. 9 is a diagram showing another exemplary layout screen for free specification use.

FIG. 9 is a diagram showing an exemplary layout screen for free specification use when the mode of thumbnail size is set to "automatic specification". In this example, because the mode of layout is also set to "automatic specification", every time the user additionally provides a thumbnail target area, the thumbnail layout is automatically set. That is, in the layout box $R_L$, the thumbnail target area selected and added as above is automatically laid out in accordance with a predetermined algorithm. Herein, because the mode of thumbnail size is set to "automatic specification", the thumbnail size is the same as the thumbnail size as a result of the automatic placement in the layout box $R_L$. As such, the text boxes T5 and T6 do not accept a user input, but display therein the numerical values of "100" and "30", which are respectively the thumbnail sizes as a result of the automatic placement in the layout box $R_L$.

3-2. Operation of Thumbnail Writing

Figure 10:
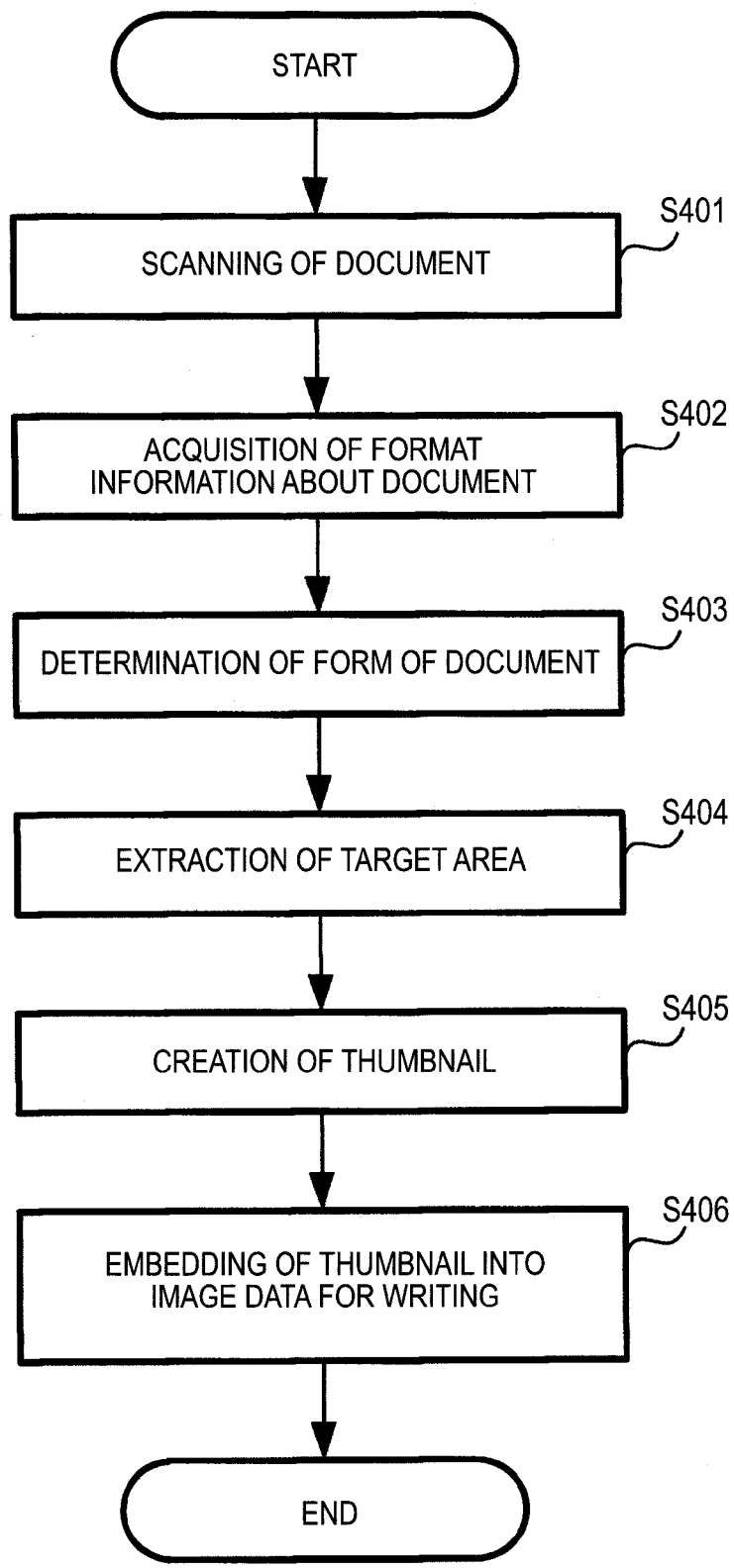
FIG. 10 is a flow diagram of the operation of writing of thumbnails.

FIG. 10 is a flow diagram showing the operation of thumbnail writing in the image processing device 1. A user places a copy of document on a platen glass (not shown) in the image acquisition section 17, and then issues a command for writing of thumbnails by operating the operation section 15. In response thereto, the image acquisition section 17 being the image data acquisition unit 171 scans the document under the control of the CPU 11, and then forwards the image data 131 corresponding to the scanning details to the CPU 11 (step S401). The CPU 11 then stores the provided image data 131 into the RAM 13, and functions as the format information calculation unit 111, i.e., calculates the format information 132 from the image data 131 for storage into the RAM 13 (step S402).

Next, the CPU 11 refers to the format information stored in the file system 142 via the form database 141, and searches any format information showing a coincidence with the format information 132 being the calculation result, thereby determining which form corresponds to the image data 131 (step S403). To be more specific, for each of the format information stored in the file system 142, the CPU 11 calculates a difference from the format information 132 being the calculation result, and then compares the difference with a predetermined threshold value. When the resulting difference falls within a threshold range, the CPU 11 determines the form corresponding to the image data 131 based on the form identification information stored in the form database 141 with a correlation with the form information above. The CPU 11 then reads, from the target area database 143, the information about the thumbnail target area correlated with thus determined form, i.e., position and size, and extracts the target area data 133 from the image data 131 (step S404). The target area data 133 here is the one representing the image of the thumbnail target area. The CPU 11 then lays out the image represented by the target area data 133 in accordance with the layout read from the layout database 144 as such, thereby generating thumbnail data of a thumbnail (step S405). After the thumbnail data is generated as such, the CPU 11 embeds the thumbnail data to the image data 131 being the scanning result as above, and writes the resulting data to the file system 142 (step S406).

As such, the image processing device 1 enables registration of a form, one or more thumbnail target areas in the form, and a layout of the thumbnail target areas. The image processing device 1 is also capable of automatically discriminating the form of any scanned document, generating a thumbnail corresponding to the discriminated form, and embedding the thumbnail to image data of the document for storage. This accordingly eliminates the need for a user to make settings of a thumbnail target area and a layout every time a document is scanned, and leads to advantages of being able to display any characteristics of the document with an image smaller than the original image of the document. Such advantages are achieved by combining any characteristic portions of the documents sharing the same form.

4. Modified Example

The exemplary is described above, and the details of this exemplary can be modified as below. The following modified examples may be combined together.

1. In the exemplary described above, the layout database 144 makes a registration of a layout with a one-to-one relationship with a form, but alternatively, may register a plurality of layouts on a form basis. If this is the case, the layout box $R_L$ provided for laying out a thumbnail target area therein may be provided with a tab area Rt for use to make a selection from a plurality of layouts.

FIG. 11 is a diagram showing an exemplary layout screen for registration of a plurality of layouts. As shown in the drawing, immediately above the layout box $R_L$ on the lower right portion, a tab area Rt is provided for use to make a selection from a plurality of layouts. This tab area Rt displays layout names for identification of the layouts such as "layout 1", and "layout 2", and indicates which layout is being selected depending on the angle of the lines boxing the layout names. In FIG. 11 example, selected is the layout name of "layout 2", which is boxed by a line like a trapezoid whose lower side is longer than the upper side. The details of the selected layout are displayed in the layout box $R_L$. The far right side of the tab area Rt includes an area with a character string of "Addition of Layout", and when a mouse click is made on this area, any new layout is additionally provided to the layout box $R_L$. As such, when a plurality of layouts are registered on a form basis, the registered layouts may each have a different thumbnail target area for use. Considered here is an exemplary case where three thumbnail target areas r1, r2, and r3 are selected for a specific form, and two layouts L1 and L2 are registered therefor. In such a case, for the layout L2, only the thumbnail target areas r1 and r2 may be used, and for the layout L2, only the thumbnail target area r2 and r3 may be used.

2. Alternatively, among a plurality of layouts registered on a form basis, one layout may be discriminated from the remaining layouts. In the layout box $R_L$ of FIG. 11, a button B14 displayed on the lower right includes a character string of "Representative Layout", and when a mouse click is made on such a button B14, the CPU 11 stores, into the layout database 144, the layout being selected at the time of mouse click as a representative layout. This accordingly discriminates the layout selected as a representative layout from the remaining layouts.

Figure 12:
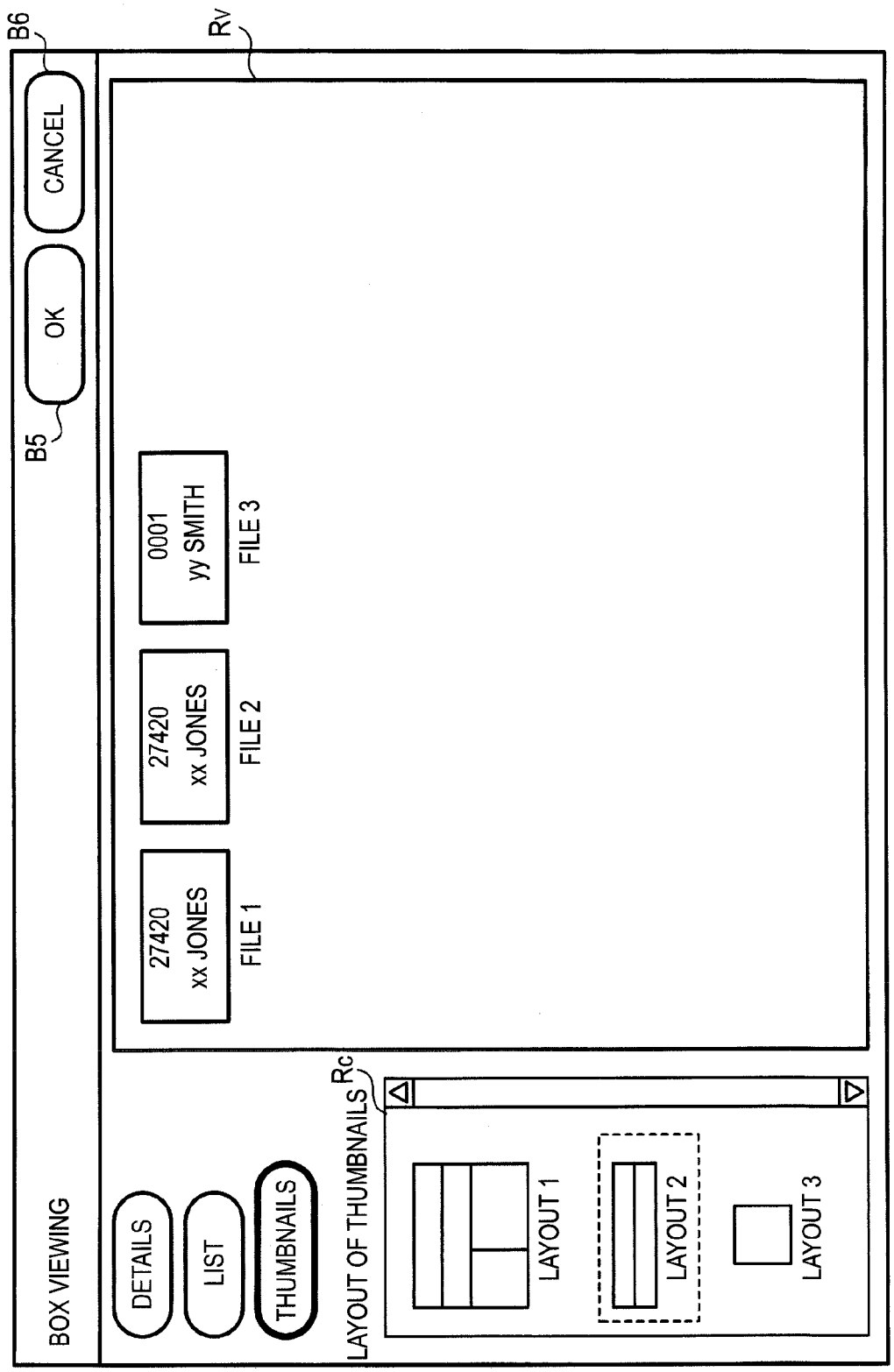
FIG. 12 is a diagram showing exemplary display of thumbnails in the form of a list in a modified example.
Figure 13:
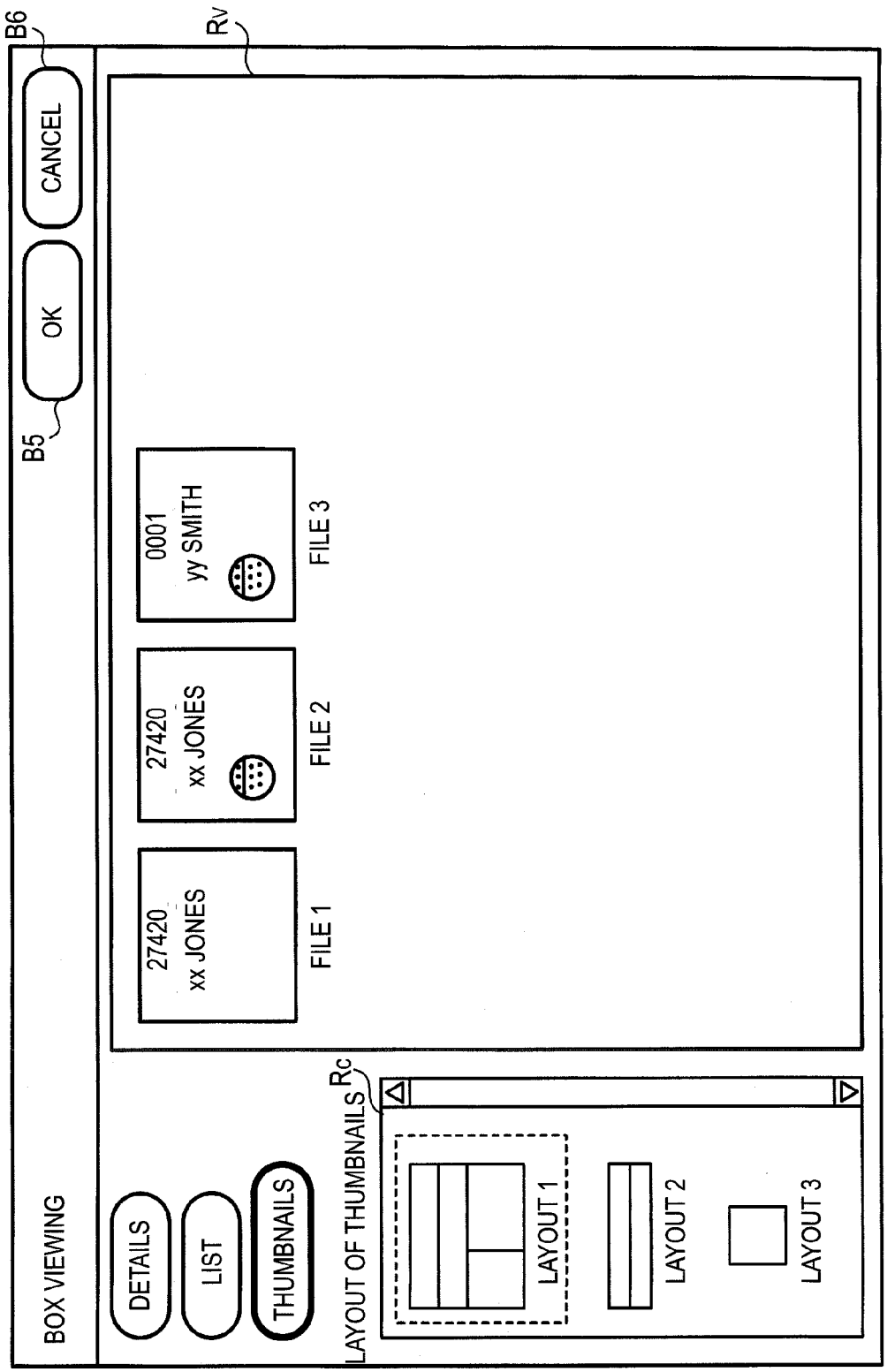
FIG. 13 is a diagram showing another exemplary display of thumbnails in the form of a list in the modified example.

3. Also when a plurality of layouts are registered on a form basis as such, even if any scanned document is defined by form at the time of writing of thumbnails, a thumbnail for embedding into image data of the document is not yet defined because a thumbnail possibly corresponding to the form varies in layout. In consideration thereof, any of a plurality of layouts may be provisionally selected, and a thumbnail may be created for any scanned document. Thereafter, the resulting thumbnail may be displayed with others in the form of a list to urge the user to determine whether the provisionally-selected layout will do or not. FIG. 12 is a diagram showing exemplary display of thumbnails in the form of a list in this modified example. On the left side of such a screen, a thumbnail layout selection area Rc is provided for display of a plurality of layouts registered for the form. On the right side of the thumbnail layout selection area Rc, a list display area Rv is provided for display of, in the form of a list, thumbnails created for the scanned document by adopting the layout provisionally selected in the thumbnail layout selection area Rc. In FIG. 12, the layout provisionally selected is "layout 2" located in the middle of the three layouts. Then in the thumbnail layout selection area Rc, the layout being selected is framed therearound by a broken line. Assuming now is that the user selects the "layout 1" by making a mouse click on the "layout 1" among the layouts arranged in the thumbnail layout selection area Rc on the screen. FIG. 13 is a diagram showing exemplary display of thumbnails in the form of a list when the user selects any specific layout. When the user selects "layout 1", thus selected "layout" is accordingly framed therearound with a broken line to indicate that the "layout 1" is being selected in the thumbnail layout selection area Rc. In response thereto, in the list display area Rv, thumbnails created by adopting the "layout 1" to each of the documents are displayed in the form of a list. In this state, if the user makes a mouse click on the OK button B5 located on the upper right of the screen, the thumbnails created by adopting the currently-selected "layout 1" are each correlated with its image data by the writing unit 118, and then written into the storage section 14.

Figure 14:
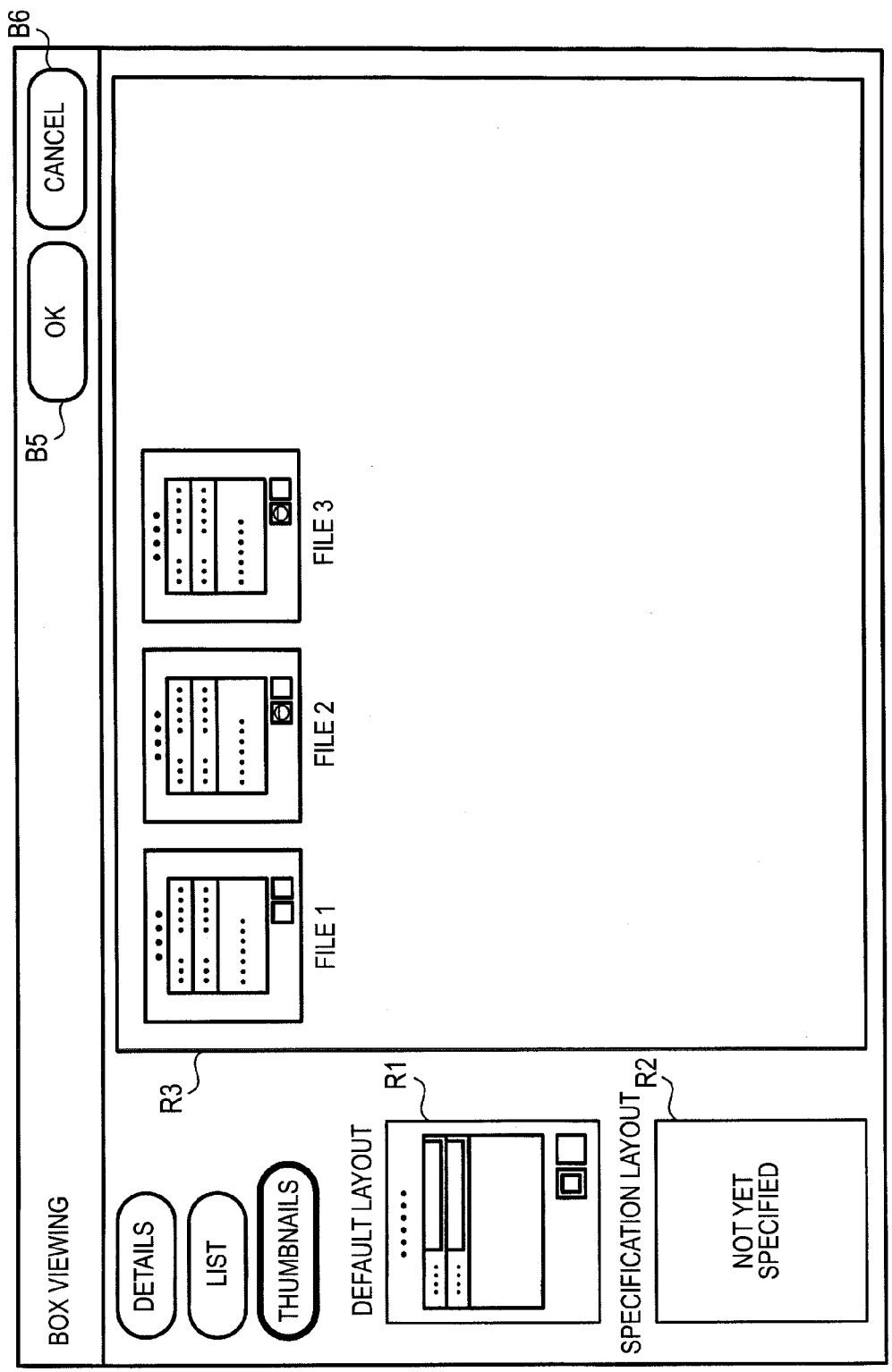
FIG. 14 is a diagram showing an exemplary screen for layout edition in the modified example.

4. Exemplified in the above exemplary is the case that a form is registered with a layout, but the layout is not necessarily registered on a form basis. If this is the case, the layout database 144 is not necessarily provided to storage section 14. Without the storage section 14 as such, a user's layout edition operation may be accepted at the time of writing of thumbnails, and in response to the edition operation, writing of thumbnails may be performed. FIG. 14 is a diagram showing an exemplary screen for layout edition in such a modified example. In response to a user operation of issuing a command to the image processing device 1 to scan a document, and to make display of thumbnails in the form of a list, the CPU 11 displays such a screen as shown in FIG. 14. On this screen, the upper left portion displays various types of operation buttons, the middle left portion displays a default layout area R1 being a predetermined layout, the lower left portion displays a specification layout area R2 being an area for layout edition, and the right portion from the center displays a list display area R3. The default layout area R1 displays a thumbnail-size layout as a result of scaling down a form image in its entirety, and the layout includes a thumbnail target area registered during form registration. Also in FIG. 14, the specification layout area R2 displays a character string of "Not Yet Specified", indicating that no layout is specified and no thumbnail target area is provided. The list display area R3 displays, in the form of a list, thumbnails created by adopting the entirely-scaled-down layout displayed in the default layout area R1.

Figure 15:
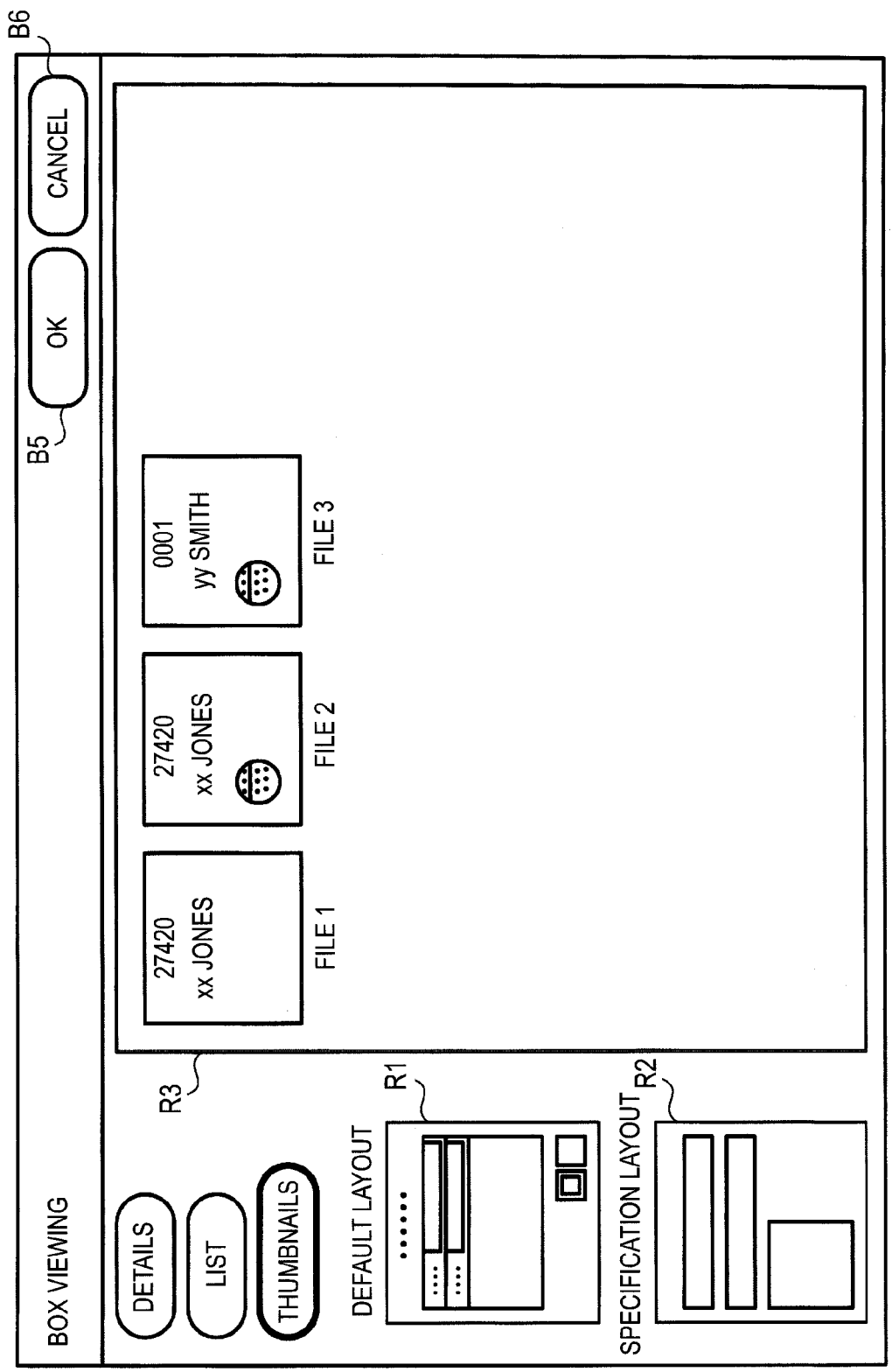
FIG. 15 is a diagram showing another exemplary screen for layout edition in the modified example.

With a user's mouse drag-and-drop of any of the thumbnail target areas displayed in the default layout area R1 to the specification layout area R2, the CPU 11 generates placement information in response to such a user operation. Because a thumbnail target area is laid out in accordance with this placement information, into the specification layout area R2 that has shown a character string of "Not Yet Specified", the thumbnail target area being the result of the drag-and-drop is laid out. That is, in this modified example, the CPU 11 functions as a placement information generation unit that generates placement information about a position to where a configuration portion extracted by the extraction unit is placed in response to a user operation. FIG. 15 is a diagram showing an exemplary screen for layout edition when the thumbnail target area is laid out in the specification layout area R2. In response to the user operation, the list display area R3 displays therein, in the form of a list, thumbnails created by adopting the layout displayed in the specification layout area R2. As such, even if a layout is not registered on a form basis, a thumbnail target area registered for every form is accordingly laid out during every writing of thumbnails for determining a layout. In this manner, the thumbnails in the layout edited by the user as such can be each correlated with image data before storage.

Figure 16:
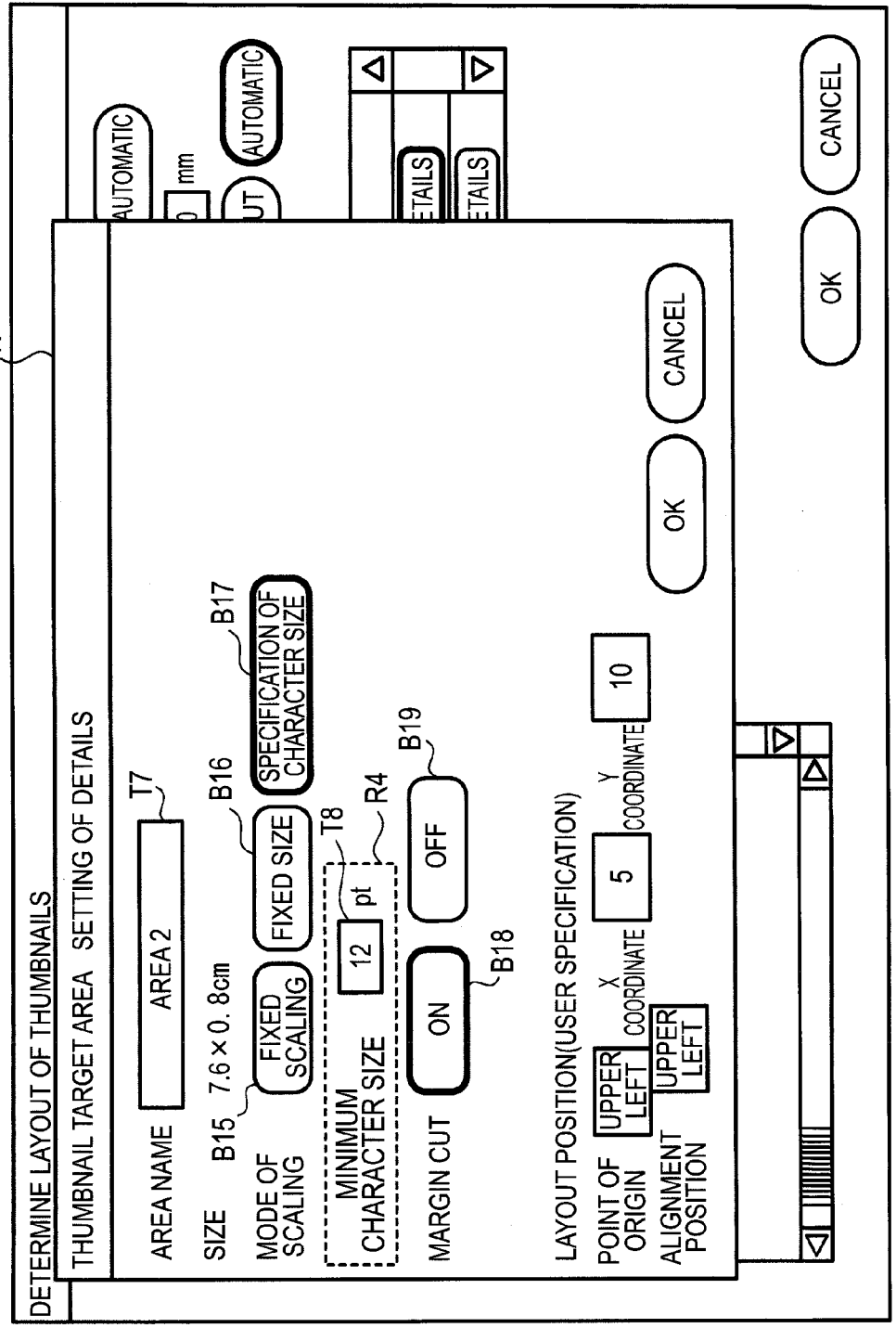
FIG. 16 is a diagram showing an exemplary setting screen of scale-up and -down factors for a thumbnail target area.

5. In the exemplary described above, although no description is given about a scale-up factor and a scale-down factor for a thumbnail target area in a layout, the thumbnail target area may be scaled up or down before layout. Alternatively, the screen for such scaling-up and -down may be displayed in response to a mouse click on any of buttons B13 of FIG. 7. If this is the case, the CPU 11 scales up or down a thumbnail target area in accordance with a predetermined scale-up or -down factor, and uses the resulting thumbnail target area for creating a thumbnail. That is, the CPU 11 functions as an alternative image generation unit that generates an alternative image by changing the size of any extracted configuration portion to be of a predetermined size. FIG. 16 is a diagram showing an exemplary screen for setting of scale-up and -down factors for a thumbnail target area. On the screen of FIG. 7, when the user makes a mouse click on any of the buttons B13, the display section 16 accordingly displays thereon a pop-up window W as shown in FIG. 7. On the pop-up window W, the text box T7 displays a character string indicating the name of the thumbnail target area corresponding to the clicked button B13, and this character string can be edited by the keyboard of the operation section 15. Beneath the text box T7, the size of the thumbnail target area is displayed. In the drawing, this size is "7.6×0.8 cm". Beneath the display of this size, buttons B15, B16, and B17 are displayed for use to select which mode to use to determine a scale-up or -down factor for the thumbnail target area in the layout (hereinafter, such a mode is referred to as mode of scaling). Beneath such a group of buttons, an area R4 is provided for editing the detailed setting in accordance with which mode is selected for scaling. The button B15 is used to select "fixed scaling" as a mode of scaling. When a mouse click is made on the button B15, the area R4 displays therein a text box for input of a scale-up or -down factor in percentage with respect to the original size of the thumbnail target area. When this text box is provided with a numerical value of "13%", for example, the scale-down factor is accordingly set to 13%, and when a numerical value of "150%" is provided thereto, the scale-up factor is accordingly set to 150%.

The button B16 is used to select "fixed size" as a mode of scaling. When a mouse click is made on the button B16, the area R4 accordingly displays text boxes for input of a size of the thumbnail target area completed with scale-up or -down in the unit of "mm" both in the vertical and horizontal directions. By these text boxes provided with a numerical value of size, the scaled-up or -down thumbnail target area is defined by size. Alternatively, the text boxes may be configured as to be provided with only a numerical value of size in either the vertical or horizontal direction. If this is the case, the scale-up or -down factor in the direction not provided with a numerical value is set to the same value as that in the other direction, and thus the thumbnail target areas completed with scale-up or -down will be all similar in shape.

The button B17 is used to select "character size specification" as a mode of scaling. When a mouse click is made on the button B17, the area R4 accordingly displays therein a text box T8 for input of a character size in minimum (hereinafter, referred to as minimum character size). With "character size specification" selected as such, the actual scale-up and -down factors are determined for every document scanned during writing of thumbnails. To be specific, when a document is scanned, and when image data of a thumbnail target area corresponding to the document is extracted, the CPU 11 executes a character recognition process with respect to the image data. As a result of this character recognition process, from the characters recognized thereby, any character of a minimum size is determined, and scale-up and -down factors are determined for the thumbnail target area to make the size coincide with the minimum character size. That is, when selected as the mode of scaling is "character size specification", the CPU 11 functions as an alternative image generation unit that recognizes any character included in a configuration portion extracted by the extraction unit, and generating the alternative image by changing the size of the configuration portion to have the character of a predetermined size.

FIG. 16 example shows a case where a user makes a mouse click on the button B17, and selects "character size specification" as a mode of scaling. The text box T8 in this case is provided with a numerical value of "12", and this numerical value is set as a minimum character size in the unit of "pt". Herein, the unit of "pt" denotes the unit of a reference dimension of characters defined by the JIS (Japanese Industrial Standards) Z 8305-19621. That is, in FIG. 16, the minimum character size is set to "12 pt". Accordingly, if the CPU 11 extracts image data of a thumbnail target area of a specific document, and if a character recognized in the image data has the size of "24 pt", for example, $12/24=0.5$. Therefore, the thumbnail target area is set to 50% of scale-down factor. As such, with the minimum character size taking a value of size that does not cause the resulting character to look flat and difficult to see, the characters in a thumbnail remain intact, i.e., do not look flat.

Beneath the area R4, buttons B18 and B19 are displayed next to a character string of "Margin Cut". The button B18 is used to issue a command to the image processing device 1 to execute a process of margin cut with respect to the thumbnail target area, which is indicated by name by the character string in the text box T7. With the process of margin cut, the thumbnail target area is subjected to a labeling process of comparing, on a pixel basis, a pixel value with a predetermined threshold value. After such a process, in the thumbnail target area, any rectangle circumscribing a group of pixels whose values are exceeding the threshold value is defined, and only the inside of the rectangle is left as a thumbnail target area, and the remaining is eliminated. In this manner, in the original thumbnail target area, any pixel located in the vicinity of the external edge and having a value not exceeding a predetermined threshold value is eliminated as a margin. The button B19 is used to issue a command to the image processing device 1 not to execute such a margin cut process.

6. In the exemplary described above, the CPU 11 functioning as the form determination unit 115 searches, via the form database 141, the format information stored in the file system 142 to find any format information showing a coincidence with the format information 132 being a calculation result from any scanned document, thereby defining the scanned document by form. As an alternative to define the form of the document as such, a plurality of form potentials may be extracted for the document. As described above, the term of "coincidence between two format information" means a requirement with certain flexibility, i.e., a difference therebetween falls within a threshold range. Therefore, when the format information of a plurality of forms is relatively similar in details, there may be a case where the form determination unit 115 fails in defining the document by form. If this is the case, the CPU 11 may extract a plurality of forms each showing a difference falling in a predetermined range from the format information 132 being a calculation result from the scanned document. The CPU 11 then may refer to the thumbnail layout registered in each of the forms, and display the thumbnail of the document with a correlation with each of the forms. Thereafter, the CPU 11 may display the forms to make those available for the user to select.

Figure 17:
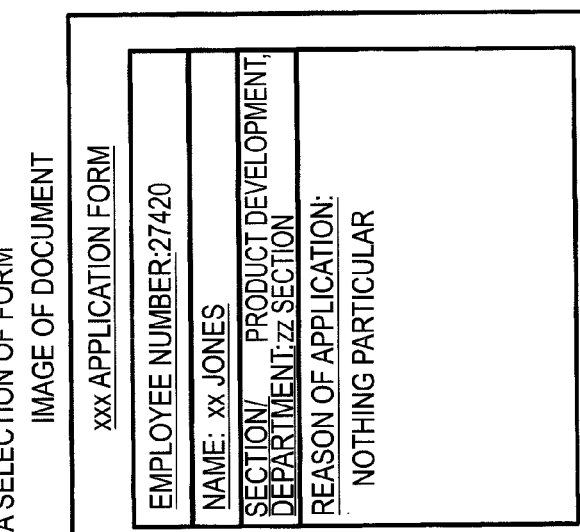
FIG. 17 is a diagram showing an exemplary screen for form selection in the modified example.

FIG. 17 is a diagram showing an exemplary screen for form selection in this modified example. When the form determination unit 115 fails in defining the document by form, the CPU 11 displays the screen for form selection of FIG. 17. This screen for selection use displays thereon a message together with a title in a character string of "Error in Form Recognition". The message herein is about "Failure of Automatic Form Discrimination of Scanned Document. Make a Selection of Form". Beneath such a message, displayed are a preview area Rs, and a similar form selection area Ra. The preview area Rs displays therein an image of a document, and the similar form selection area Ra displays, in the form of a list, a plurality of forms extracted as form potentials for the document to make those available for the user to select. When the form determination unit 115 fails in defining the document by form as such, the CPU 11 refers to the form database 141 of the storage section 14 to find a plurality of format information showing a difference falling within a threshold range from the format information 132 of the scanned document. The CPU 11 then extracts a form represented by each of the form information, and displays the identification information of the forms on the display section 16. The CPU 11 also lays out the thumbnail target area by adopting the layout completed with form registration as such, thereby creating a thumbnail. The resulting thumbnail is correlated with the identification information of the corresponding form for display on the display section 16. As a result, the similar form selection area Ra displays therein the identification information of each of the forms ("form name" in the drawing), and a "thumbnail example" with a correlation therebetween. The "thumbnail example" is a thumbnail generated from the image of the scanned document by adopting the layout registered for each of the forms. That is, when the format determination unit fails in defining the form of the document of the image data 131, the CPU 11 functions as a format extraction unit, i.e., searches the format information stored in the format information storage unit to find a plurality of format information each showing a difference falling within a threshold range from the format information about the format of the document, and extracts the format found in the plurally-extracted format information. The user makes a mouse click on the display area of the "form name" displayed in the similar form selection area Ra, or on the display area of the "thumbnail example", thereby selecting any of the forms. The selected display area is accordingly framed by a thick line as shown in the drawing. As such, after selecting any of the forms, when the user makes a mouse click on the OK button B5 located in the lower right portion of the screen, the selected form is confirmed for use as the form of the document, and the thumbnail data 134 of the "thumbnail example" corresponding to the form is stored in the storage section 14 with a correlation with the image data 131. That is, the CPU 11 functions as a writing unit that displays alternative images generated by the alternative image generation unit in accordance with each of a plurality of formats extracted by the format extraction unit, and in response to a user operation, selects any one of the alternative images for writing into the storage unit.

Note that, in the modified example 4, because a layout is not registered on a form basis, if the scanned document cannot be defined by form, the CPU 11 cannot generate a thumbnail by adopting the layout corresponding to each of the forms. In this case, the CPU 11 may display one of the thumbnail target areas registered in the forms as a "thumbnail example" described above. The user thus refers to the "thumbnail example" displayed as such to make a mouse click operation similarly to the above. In response to such an operation, the CPU 11 may select one of the thumbnails for storage into the storage section 14. That is, in this case, the CPU 11 functions as a writing unit, i.e., reads, from the extraction-portion determination information storage unit, the extraction-portion determination information stored for each of the formats extracted by the format extraction unit, and generates an alternative image being an image of each of the configuration portions determined by the extraction portion determination information. The CPU 11 then displays the resulting alternative images to make those available for a selection in response to a user operation, and writes the selected one of the alternative images to the storage unit.

7. In the exemplary described above, utilizing the characteristic of image format, the writing unit 118 provides the file system 142 with data being a result of embedding the thumbnail data 134 into the image data 131. Alternatively, the writing unit 118 may establish a correlation between the image data 131 and the thumbnail data 134 before storage into the storage section 14. If this is the case, even if the image format storing the image data 131 is not of a type that can include the thumbnail data 134, for example, a correlation can be established between the image data 131 and the thumbnail data 134. Herein, the writing unit 118 does not necessarily store the thumbnail data 134 with a correlation with the image data 131. That is, the writing unit 118 serves well as long as it writes the thumbnail data 134 into the storage section 14.

8. In the exemplary described above, the form registration unit 112 determines whether or not a user is authorized by referring to the password table 145. This is surely not restrictive, and the form registration unit 112 may determine whether or not the user is allowed for data writing to a destination stored in the RAM 13. In this case, the file system 142 serves well as long as it stores the identification information about the storage area with a correlation with the user identification information about users who are authorized for data writing into the storage area. The CPU 11 may refer to the storage details as such in the file system 142 for making such a determination as described above.

9. The programs to be run by the CPU 11 in the image processing device 1 can be distributed in the form of a computer-readable recording medium, e.g., magnetic recording medium such as magnetic tape and magnetic disk, optical recording medium such as optical disk, magneto-optic recording medium, and semiconductor memory. These programs can also be downloaded over a network such as the Internet. Herein, a control unit in charge of control as above is not surely restrictive to the CPU, and various other devices are also applicable, e.g., processor provided specifically therefor.

Moreover, the components, i.e., the storage section 14, the operation section 15, the display section 16, and the image acquisition section 17, may be all external devices that are connected via the communications section 18. In this case, the CPU 11 may control such external devices via the communications section 18.

10. In the exemplary described above, for calculating a difference between two format information, the CPU 11 sums the difference between two numerical data values of x and y coordinates of points in each of the format information. Alternatively, such summing of the difference is preferably performed after the difference is converted into an absolute value. Still alternatively, the CPU 11 may sum the square of the difference for calculating the difference between two format information.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the skilled in the art to understand the invention for various exemplary embodiments and with the various modifications as are suited to the particular use contemplated. It is intended that the scope of the invention be defined by the following claims and their equivalents.

What is claimed is:

1. An image processing device, comprising:
   a memory configured to function as a format information storage unit that stores format information about a format of a document;
   a processor configured to function as:
      an extraction-portion determination information storage unit that stores, in association with the format, extraction-portion determination information that indicates positions of fields among a plurality of fields extracted from the document; and
      a placement information acquisition unit that acquires placement information that indicates positions at which contents of the fields are to be located in an alternative image of the document; and
   a scanner configured to function as an image data acquisition unit that acquires image data of the document,
   the processor further configured to function as:
      a format determination unit that acquires format information about a format of the document of the image data through an analysis of the image data acquired by the image data acquisition unit, and determines the format of the document through a comparison with the format information stored in the format information storage unit;
      an extraction unit that reads, from the extraction-portion determination information storage unit, the extraction-portion determination information corresponding to the format determined by the format determination unit, and extracts the contents of the fields indicated in the extraction-portion determination information in association with the format;
   an alternative image generation unit that generates the alternative image derived by placing the contents of the fields extracted by the extraction unit at the positions where the contents of the fields are to be located in the alternative image of the document in accordance with the placement information acquired by the placement information acquisition unit; and
   a writing unit that writes the alternative image generated by the alternative image generation unit into a storage unit.

2. The image processing device according to claim 1, wherein the placement information acquired by the placement information acquisition unit comprises first placement information that indicates first positions at which the contents of the fields are to be located in a first thumbnail image and second placement information that indicates second positions at which the contents of the fields are to be located in a second thumbnail image,
   wherein the alternative image generated by the alternative image generation unit comprises a first alternative image derived by placing the contents of the fields at the first positions in the first alternative image and a second alternative image derived by placing the contents of the fields at the second positions in the second alternative image, and
   wherein the writing unit writes any of the first alternative image and the second alternative image selected from among the first alternative image and the second alternative image into the storage unit.

3. An image processing device comprising:
   a memory configured to function as a format information storage unit that stores format information about a format of a document;
   a processor configured to function as an extraction-portion determination information storage unit that stores, in association with the format, extraction-portion determination information that indicates positions of fields among a plurality of fields extracted from the document; and
   a scanner configured to function as an image data acquisition unit that acquires image data of the document,
   the processor further configured to function as:
      a format determination unit that acquires format information about a format of the document of the image data through an analysis of the image data acquired by the image data acquisition unit, and determines the format of the document through a comparison with the format information stored in the format information storage unit;

an extraction unit that reads, from the extraction-portion determination information storage unit, the extraction-portion determination information corresponding to the format determined by the format determination unit, and extracts contents of the fields indicated in the extraction-portion determination information in association with the format;

a placement information generation unit that generates placement information that indicates positions at which the contents of the fields are to be located in an alternative image of the image data in response to a user operation;

an alternative image generation unit that generates the alternative image derived by placing the contents of the fields extracted by the extraction unit at the positions where the contents of the fields are to be located in the alternative image of the document in accordance with the placement information generated by the placement information generation unit; and a writing unit that writes the alternative image generated by the alternative image generation unit into a storage unit.

4. The image processing device according to claim 1, wherein the alternative image generation unit generates the alternative image by changing the at least one of the contents of the fields extracted by the extraction unit to be of a predetermined size.

5. The image processing device according to claim 3, wherein the alternative image generation unit generates the alternative image by changing the at least one of the contents of the fields extracted by the extraction unit to be of a predetermined size.

6. The image processing device according to claim 1, wherein the alternative image generation unit generates the alternative image by finding a character in at least one of the contents of the fields extracted by the extraction unit, and by changing the size of the at least one of the contents of the fields to make the character have a predetermined size.

7. The image processing device according to claim 3, wherein the alternative image generation unit generates the alternative image by finding a character in at least one of the contents of the fields extracted by the extraction unit, and by changing the size of the at least one of the contents of the fields to make the character have a predetermined size.

8. The image processing device according to claim 1, further comprising:
the processor further configured to function as a placement information specification unit that specifies, in response to a user operation, the positions at which the contents of the fields indicated by the extraction portion specification information are to be located in an alternative image of the document,
wherein the placement information acquisition unit acquires the placement information specified by the placement information specification unit.

9. The image processing device according to claim 1, further comprising:
the processor further configured to function as a format extraction unit that acquires, if the format determination unit fails in determining the format of the document of the image data, first format information and second format information stored in the format information storage unit having a difference between the format information about the format of the document falling within a threshold range, and extracts the first format information and the second format information,
wherein the writing unit displays a first alternative image and a second alternative image generated in accordance with each of the first format information and the second format information extracted by the format extraction unit, and selects one of the first alternative image and the second alternative image as the alternative image in response to a user operation for writing into the storage unit.

10. The image processing device according to claim 3, further comprising:
the processor further configured to function as a format extraction unit that acquires, if the format determination unit fails in determining the format of the document of the image data, first format information and second format information stored in the format information storage unit having a difference between the format information about the format of the document falling within a threshold range, and extracts the first format information and the second format information,
wherein the writing unit reads, from the extraction-portion determination information storage unit, the extraction-portion determination information stored for each of the first format information and the second format information extracted by the format extraction unit, and generates as the alternative image a first alternative image in accordance with the first format information and a second alternative image in accordance with the second format information for display, and selects one of the first alternative image and the second alternative image in response to a user operation for writing into the storage unit.

11. A thumbnail image generating apparatus comprising:
a processor that functions as:
an image generating unit that receives input of a document and generates an image of the document;
a format determination unit that analyzes the image, identifies fields existing at first positions within the image, and determines a format of the image based on the identified fields existing at the first positions within the image; and
a thumbnail image generating unit that (i) determines which of the identified fields existing at the first positions within the image are elements to be included at second positions in a thumbnail image of the image, based on thumbnail configuration information associated with the format of the image that identifies which of the fields existing within the image are the elements to be included in the thumbnail image, (ii) determines the second positions of the elements to be included in the thumbnail image, based on thumbnail placement information associated with the format of the image that identifies the second positions of the elements in the thumbnail image, and (iii) generates the thumbnail image of the image to include the elements at the second positions within the thumbnail image.

* * * * *